(12) United States Patent
Van Dyne

(10) Patent No.: US 9,629,491 B1
(45) Date of Patent: Apr. 25, 2017

(54) CLAMP ASSEMBLY FOR ATTACHING AN OBJECT TO A MOUNTING SURFACE

(71) Applicant: Trace Eugene Van Dyne, Sunbury, OH (US)

(72) Inventor: Trace Eugene Van Dyne, Sunbury, OH (US)

( * ) Notice: Subject to any disclaimer, the term of this patent is extended or adjusted under 35 U.S.C. 154(b) by 0 days.

(21) Appl. No.: 15/132,052

(22) Filed: Apr. 18, 2016

Related U.S. Application Data

(60) Provisional application No. 62/246,106, filed on Oct. 25, 2015.

(51) Int. Cl.
*A47G 29/00* (2006.01)
*A47G 29/08* (2006.01)
*F16M 13/02* (2006.01)
*F16B 2/10* (2006.01)
*F16B 2/18* (2006.01)

(52) U.S. Cl.
CPC ............... *A47G 29/08* (2013.01); *F16B 2/10* (2013.01); *F16B 2/18* (2013.01); *F16M 13/02* (2013.01)

(58) Field of Classification Search
USPC ........................................................ 248/219.4
See application file for complete search history.

(56) References Cited

U.S. PATENT DOCUMENTS

| | | | | |
|---|---|---|---|---|
| 725,599 A | * | 4/1903 | Smith | E21B 19/12 24/132 R |
| 863,461 A | * | 8/1907 | Smithson | B23B 31/18 24/135 K |
| 1,535,397 A | * | 4/1925 | Buffington | B60D 1/155 280/493 |
| 3,091,421 A | * | 5/1963 | Wolbers | A61G 7/0503 116/28 R |
| 3,538,559 A | * | 11/1970 | Rives | E21B 19/12 279/106 |
| 3,897,664 A | * | 8/1975 | Bogese, II | E04H 12/20 24/115 R |
| 4,852,840 A | * | 8/1989 | Marks | F16B 2/065 24/278 |
| 5,014,950 A | * | 5/1991 | Ohman | F16B 2/10 248/231.61 |

(Continued)

*Primary Examiner* — Monica Millner
(74) *Attorney, Agent, or Firm* — The Law Office of Patrick F. O'Reilly III, LLC

(57) ABSTRACT

A clamp assembly for attaching an object to a mounting surface is disclosed herein. The clamp assembly includes an upper clamp member, the upper clamp member including a first aperture formed therethrough for receiving a post member; and a lower clamp member pivotally coupled to the upper clamp member, the lower clamp member including a second aperture formed therethrough for receiving the post member. When the post member is disposed through the first aperture of the upper clamp member and the second aperture of the lower clamp member, the upper and lower clamp members are maintained in a generally stationary position relative to one another, and in an engaging relationship with the mounting surface. The clamp assembly may further include a clamp securement subassembly for additionally securing the upper and lower clamp members in place relative to one another by frictionally engaging an outer surface of the post member.

19 Claims, 12 Drawing Sheets

(56) References Cited

U.S. PATENT DOCUMENTS

| | | | | |
|---|---|---|---|---|
| 5,344,115 A * | 9/1994 | Mayne | A45B 11/00 248/229.13 |
| 5,441,225 A * | 8/1995 | Hall | B64D 43/02 248/231.61 |
| 5,478,041 A * | 12/1995 | Mayne | A45B 11/00 248/231.51 |
| 5,529,272 A * | 6/1996 | Baublitz, Sr. | B63B 49/00 248/231.71 |
| 5,833,191 A * | 11/1998 | Gennep | F16M 11/14 248/288.51 |
| 5,860,728 A * | 1/1999 | Maglica | B62J 6/00 362/191 |
| 5,964,440 A * | 10/1999 | An | F16M 13/02 24/522 |
| 6,202,266 B1 * | 3/2001 | Van den Branden | A47B 96/06 24/507 |
| 6,988,696 B2 * | 1/2006 | Attee | B25B 5/147 248/214 |
| 7,185,796 B2 * | 3/2007 | Parsons | A45F 5/02 224/197 |
| 7,530,202 B2 * | 5/2009 | Ritchie | E04H 12/20 52/147 |
| 8,056,876 B2 * | 11/2011 | Yu | F16M 11/10 248/230.4 |
| 8,286,926 B1 | 10/2012 | Van Dyne | |
| 8,720,841 B2 * | 5/2014 | Morren | F16B 2/10 248/229.2 |
| 2008/0000671 A1 * | 1/2008 | Bratt | H02G 3/32 174/135 |
| 2010/0038505 A1 * | 2/2010 | Sonnenberg | F16M 11/041 248/226.11 |
| 2013/0330118 A1 | 12/2013 | Van Dyne | |
| 2015/0108296 A1 | 4/2015 | Van Dyne | |

\* cited by examiner

CLAMP ASSEMBLY FOR ATTACHING AN OBJECT TO A MOUNTING SURFACE

CROSS-REFERENCE TO RELATED APPLICATIONS

This patent application claims priority to, and incorporates by reference in its entirety, U.S. Provisional Patent Application No. 62/246,106, entitled "Clamp Assembly For Attaching An Object To A Mounting Surface", filed on Oct. 25, 2015.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a clamp assembly. More particularly, the invention relates to a clamp assembly for attaching an object to a mounting surface or surfaces, such as the mounting surfaces of a tabletop.

2. Background

Conventional clamps are known that are designed to connect objects to one another. However, these conventional clamps suffer from numerous limitations and drawbacks. First of all, many of these conventional clamps are not versatile, and thus are not able to be used for different applications. Secondly, conventional clamps are often very limited in their load capacity, and therefore, are unable to be used for supporting objects over a certain nominal weight. Thirdly, conventional clamps frequently are susceptible to inadvertent disengagement if they are loaded over their nominal load carrying capacity.

Therefore, what is needed is a clamp assembly that is readily versatile, and is capable of being used for many different applications. Also, a clamp assembly is needed that has a substantial load carrying capacity, and thus is capable of supporting relatively heavy objects from a support surface. In addition, a clamp assembly is needed that is not susceptible to inadvertent disengagement even if it is significantly loaded with relatively heavy objects.

BRIEF SUMMARY OF EMBODIMENTS OF THE INVENTION

Accordingly, the present invention is directed to a clamp assembly that substantially obviates one or more problems resulting from the limitations and deficiencies of the related art.

In accordance with one or more embodiments of the present invention, there is provided a clamp assembly for attaching an object to a mounting surface, the clamp assembly comprises an upper clamp member, the upper clamp member including a first aperture formed therethrough for receiving a post member; and a lower clamp member pivotally coupled to the upper clamp member, the lower clamp member including a second aperture formed therethrough for receiving the post member. When the post member is disposed through the first aperture of the upper clamp member and the second aperture of the lower clamp member, the upper and lower clamp members are maintained in a generally stationary position relative to one another, and in an engaging relationship with the mounting surface.

In a further embodiment of the present invention, the upper clamp member further comprises a cantilevered top portion and a downwardly extending bottom portion, the cantilevered top portion of the upper clamp member configured to engage the mounting surface.

In yet a further embodiment, the cantilevered top portion of the upper clamp member comprises a plurality of ribs for increasing a structural rigidity of the cantilevered top portion.

In still a further embodiment, the lower clamp member further comprises a cantilevered portion and a post receiving portion, the cantilevered portion of the lower clamp member configured to engage an underside of the mounting surface, and the post receiving portion including the second aperture formed therein.

In yet a further embodiment, the cantilevered portion of the lower clamp member comprises a plurality of ribs for increasing a structural rigidity of the cantilevered portion.

In still a further embodiment, the clamp assembly further comprises a hinge subassembly for pivotally coupling the lower clamp member to the upper clamp member.

In yet a further embodiment, the upper clamp member further comprises a first plurality of spaced-apart tabs, and the lower clamp member further comprises a second plurality of spaced-apart tabs, each of the first plurality of spaced-apart tabs of the upper clamp member being engaged with first slots disposed adjacent to each of the second plurality of spaced-apart tabs of the lower clamp member, and each of the second plurality of spaced-apart tabs of the lower clamp member being engaged with second slots disposed adjacent to each of the first plurality of spaced-apart tabs of the upper clamp member, wherein the engagement between the first plurality of spaced-apart tabs and respective first slots and the engagement between the second plurality of spaced-apart tabs and respective second slots forms a portion of the hinge subassembly.

In still a further embodiment, the first plurality of spaced-apart tabs of the upper clamp member further comprise first hinge pin apertures disposed therethrough, and the second plurality of spaced-apart tabs of the lower clamp member further comprise second hinge pin apertures disposed therethrough, the first hinge pin apertures and the second hinge pin apertures together receiving a hinge pin for pivotally coupling the lower clamp member to the upper clamp member.

In yet a further embodiment, the hinge subassembly further comprises a torsional spring member, the torsional spring member configured to bias the upper and lower clamp members in the engaging relationship with the mounting surface.

In still a further embodiment, the clamp assembly further comprises a clamp securement subassembly for further securing the upper and lower clamp members in place relative to one another by frictionally engaging an outer surface of the post member.

In yet a further embodiment, the clamp securement subassembly is additionally configured to maintain the post member in a generally stationary position relative to the clamp assembly.

In still a further embodiment, the clamp securement subassembly comprises one of: (i) a cam lock mechanism, and (ii) a tensioning-style knob.

In yet a further embodiment, the clamp securement subassembly comprises a cam lock mechanism, the cam lock mechanism including a handle portion with an eccentrically-shaped end portion and a post securement member with an engagement surface for frictionally engaging the outer surface of the post member, the handle portion of the cam lock mechanism being pivotally coupled to the post securement member of the cam lock mechanism.

In still a further embodiment, the cam lock mechanism further includes a pin member for pivotally coupling the handle portion to the post securement member, the pin member being received through a pin aperture in the handle portion and an elongate pin aperture in the post securement member; and wherein, when the handle portion of the cam lock mechanism is rotated into an engagement position, the eccentrically-shaped end portion of the handle portion applies a force against the post securement member such that the engagement surface of the post securement member is pushed into frictional engagement with the outer surface of the post member.

In accordance with one or more other embodiments of the present invention, there is provided a clamp assembly for attaching an object to a mounting surface, the clamp assembly comprises an upper clamp member, the upper clamp member including a first aperture formed therethrough for receiving a post member; and a lower clamp member pivotally coupled to the upper clamp member, the lower clamp member including a second aperture formed therethrough for receiving the post member. When the post member is disposed through the first aperture of the upper clamp member and the second aperture of the lower clamp member, the upper and lower clamp members are maintained in a generally stationary position relative to one another, and in an engaging relationship with the mounting surface. In these one or more other embodiments, the clamp assembly further comprises a clamp securement subassembly for further securing the upper and lower clamp members in place relative to one another by frictionally engaging an outer surface of the post member.

In a further embodiment of the present invention, the upper clamp member further comprises a cantilevered top portion and a downwardly extending bottom portion, the cantilevered top portion of the upper clamp member configured to engage the mounting surface.

In yet a further embodiment, the cantilevered top portion of the upper clamp member comprises a plurality of ribs for increasing a structural rigidity of the cantilevered top portion.

In still a further embodiment, the lower clamp member further comprises a cantilevered portion and a post receiving portion, the cantilevered portion of the lower clamp member configured to engage an underside of the mounting surface, and the post receiving portion including the second aperture formed therein.

In yet a further embodiment, the cantilevered portion of the lower clamp member comprises a plurality of ribs for increasing a structural rigidity of the cantilevered portion.

In still a further embodiment, the cantilevered portion of the lower clamp member comprises a notch formed therein for receiving a portion of the underside of the mounting surface.

In yet a further embodiment, the upper clamp member further comprises a cantilevered top portion and a downwardly extending bottom portion, the cantilevered top portion of the upper clamp member configured to engage the mounting surface; and the lower clamp member further comprises a cantilevered portion and a post receiving portion, the cantilevered portion of the lower clamp member comprising a notch formed therein for receiving a portion of an underside of the mounting surface, and the post receiving portion including the second aperture formed therein.

In still a further embodiment, the clamp assembly further comprises a hinge subassembly for pivotally coupling the lower clamp member to the upper clamp member.

In yet a further embodiment, the clamp assembly further comprises a hinge subassembly for pivotally coupling the lower clamp member to the upper clamp member, the hinge subassembly further comprising a torsional spring member, the torsional spring member configured to bias the upper and lower clamp members in the engaging relationship with the mounting surface.

In still a further embodiment, the upper clamp member further comprises a first plurality of spaced-apart tabs, and the lower clamp member further comprises a second plurality of spaced-apart tabs, each of the first plurality of spaced-apart tabs of the upper clamp member being engaged with first slots disposed adjacent to each of the second plurality of spaced-apart tabs of the lower clamp member, and each of the second plurality of spaced-apart tabs of the lower clamp member being engaged with second slots disposed adjacent to each of the first plurality of spaced-apart tabs of the upper clamp member, wherein the engagement between the first plurality of spaced-apart tabs and respective first slots and the engagement between the second plurality of spaced-apart tabs and respective second slots forms a portion of the hinge subassembly.

In yet a further embodiment, the first plurality of spaced-apart tabs of the upper clamp member further comprise first hinge pin apertures disposed therethrough, and the second plurality of spaced-apart tabs of the lower clamp member further comprise second hinge pin apertures disposed therethrough, the first hinge pin apertures and the second hinge pin apertures together receiving a hinge pin for pivotally coupling the lower clamp member to the upper clamp member.

In still a further embodiment, the hinge subassembly further comprises a torsional spring member, the torsional spring member configured to bias the upper and lower clamp members in the engaging relationship with the mounting surface.

In yet a further embodiment, the clamp securement subassembly is additionally configured to maintain the post member in a generally stationary position relative to the clamp assembly.

In still a further embodiment, the clamp securement subassembly comprises one of: (i) a cam lock mechanism, and (ii) a tensioning-style knob.

In yet a further embodiment, the clamp securement subassembly is additionally configured to maintain the post member in a generally stationary position relative to the clamp assembly, and wherein the clamp securement subassembly comprises one of: (i) a cam lock mechanism, and (ii) a tensioning-style knob.

In still a further embodiment, the clamp securement subassembly comprises a cam lock mechanism, the cam lock mechanism including a handle portion with an eccentrically-shaped end portion and a post securement member with an engagement surface for frictionally engaging the outer surface of the post member, the handle portion of the cam lock mechanism being pivotally coupled to the post securement member of the cam lock mechanism.

In yet a further embodiment, the cam lock mechanism further includes a pin member for pivotally coupling the handle portion to the post securement member, the pin member being received through a pin aperture in the handle portion and an elongate pin aperture in the post securement member; and wherein, when the handle portion of the cam lock mechanism is rotated into an engagement position, the eccentrically-shaped end portion of the handle portion applies a force against the post securement member such that the engagement surface of the post securement member is pushed into frictional engagement with the outer surface of the post member.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
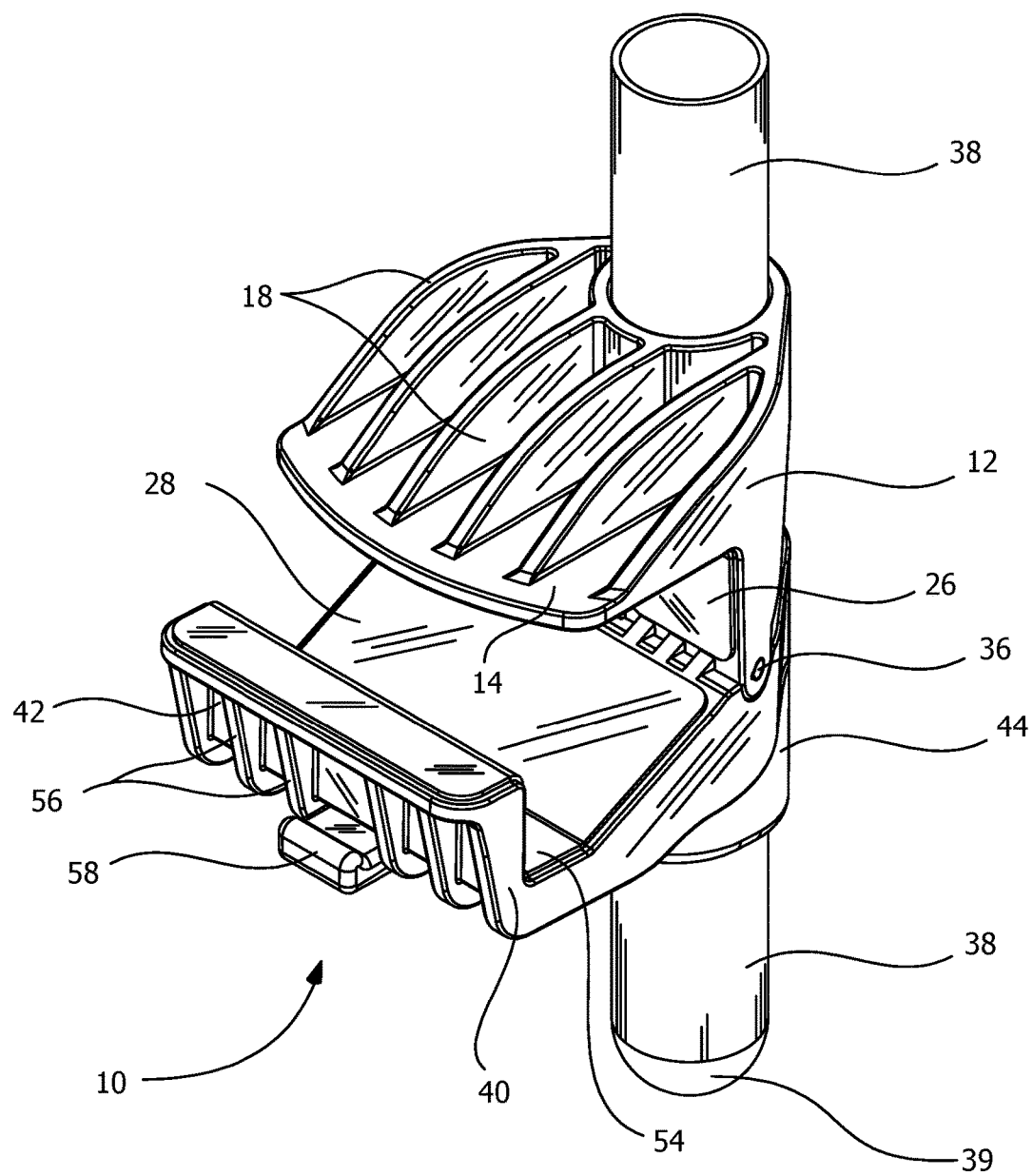
FIG. 1 is a perspective view of a clamp assembly with a post member supported therein, according to an embodiment of the invention.
Figure 2:
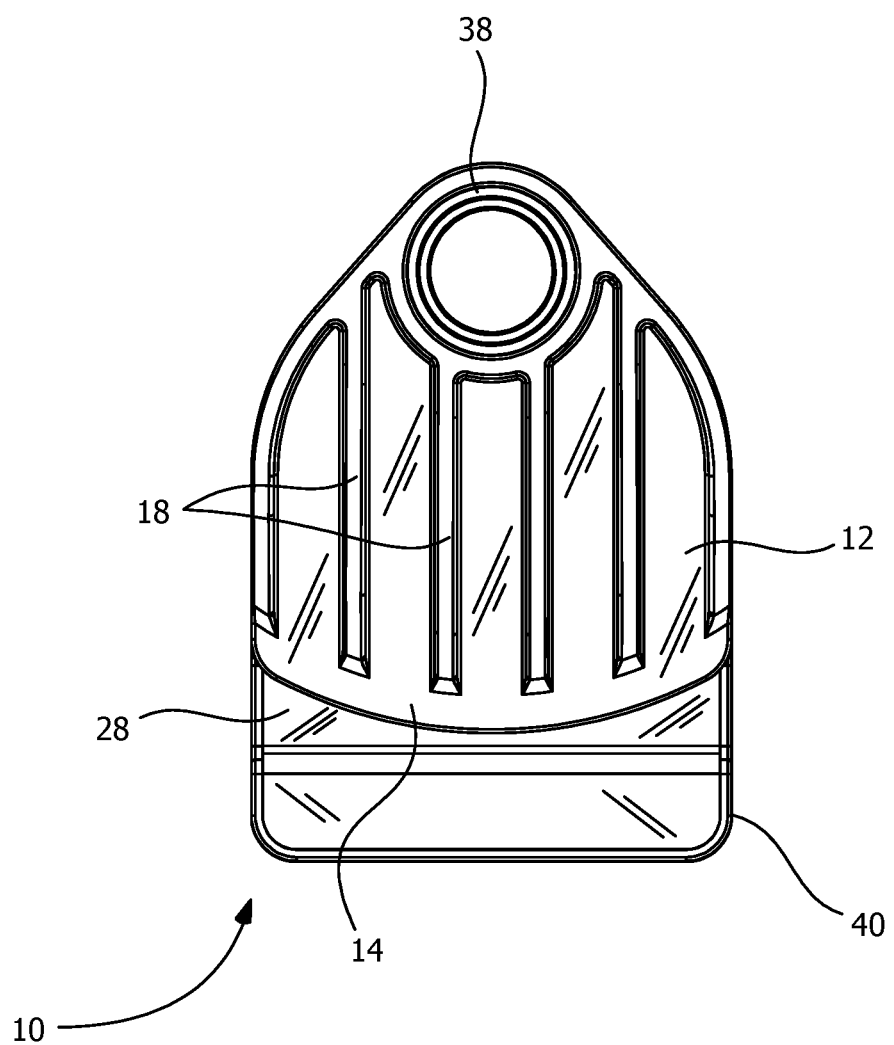
FIG. 2 is a top plan view of the clamp assembly of FIG. 1.
Figure 3:
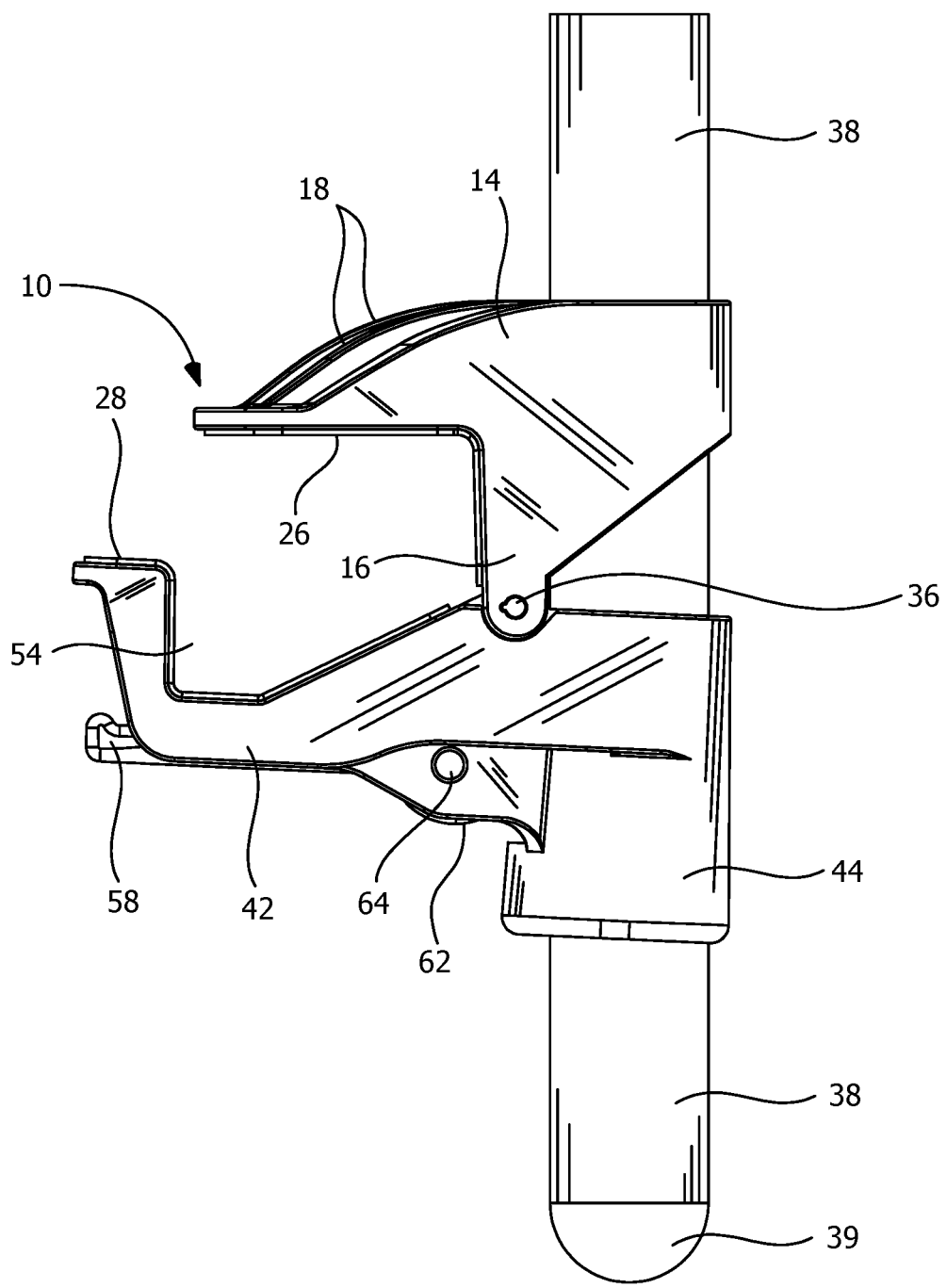
FIG. 3 is a side elevational view of the clamp assembly of FIG. 1.
Figure 4:
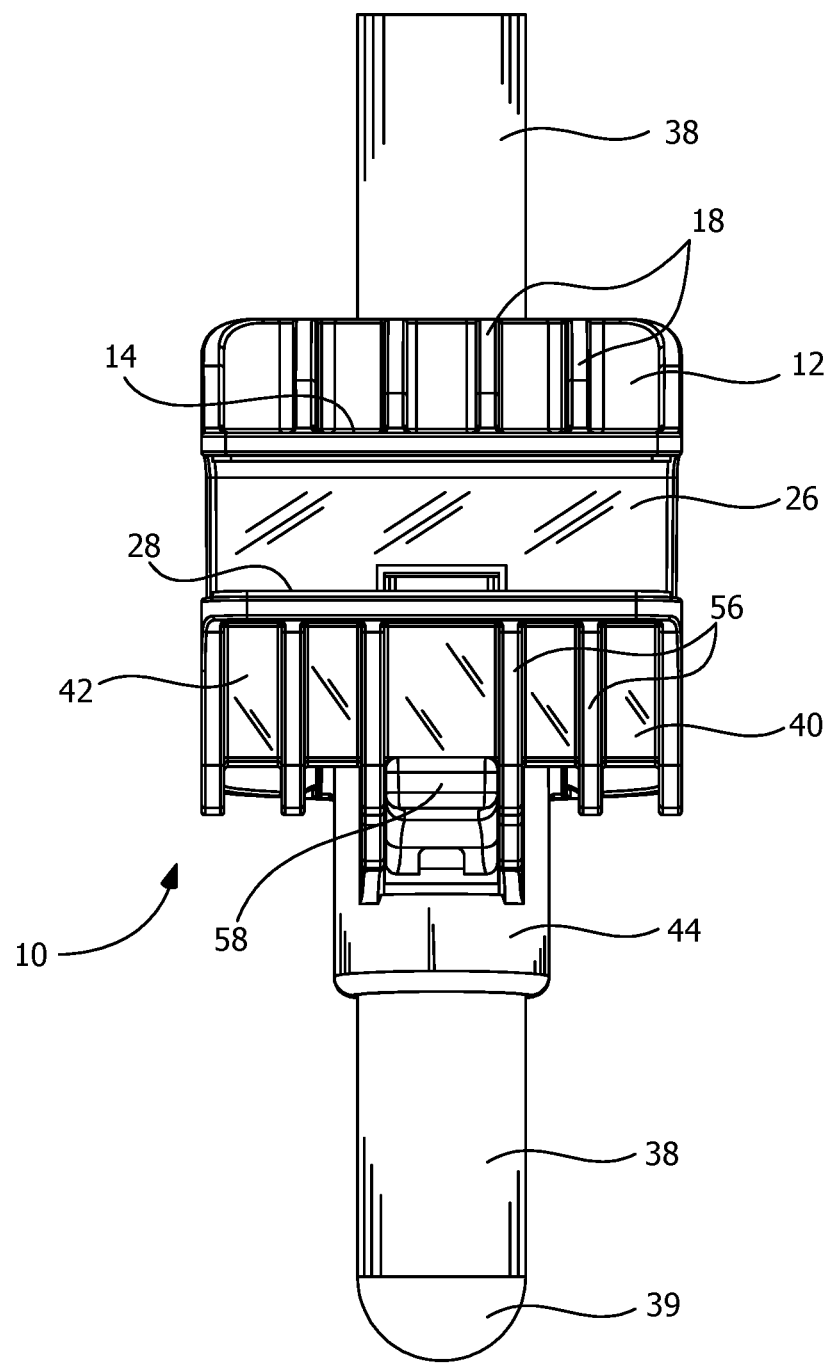
FIG. 4 is an end elevational view of the clamp assembly of FIG. 1.
Figure 5:
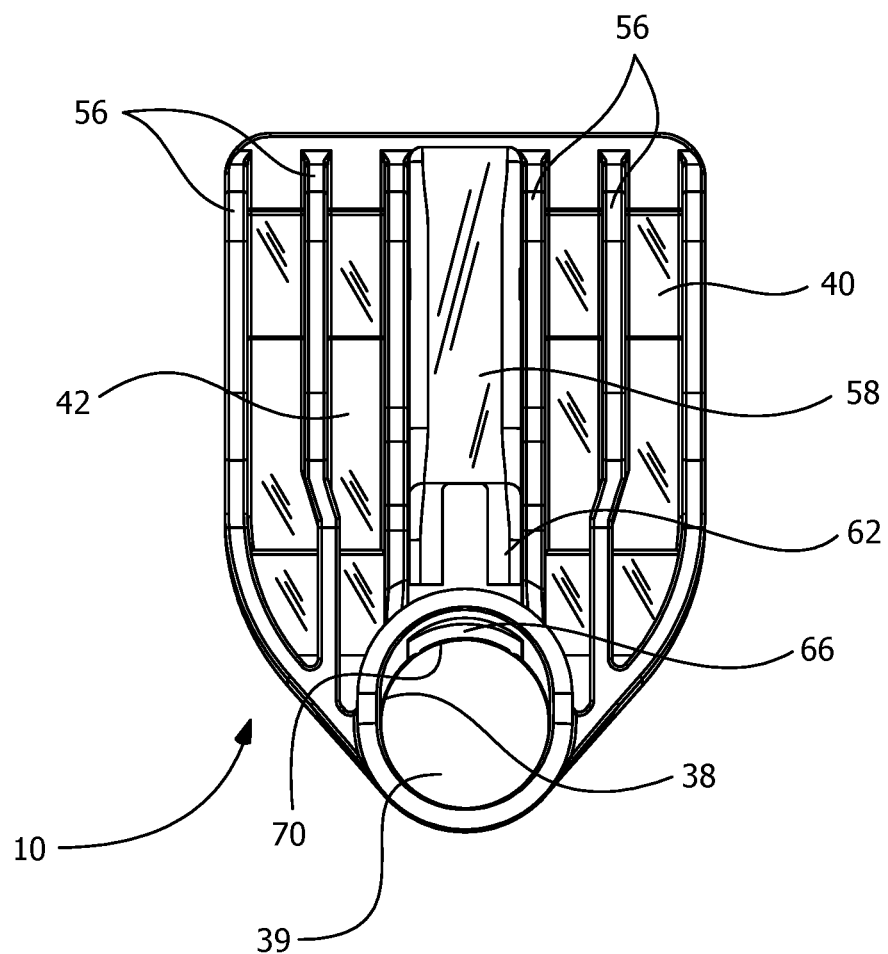
FIG. 5 is a bottom plan view of the clamp assembly of FIG. 1.
Figure 6:
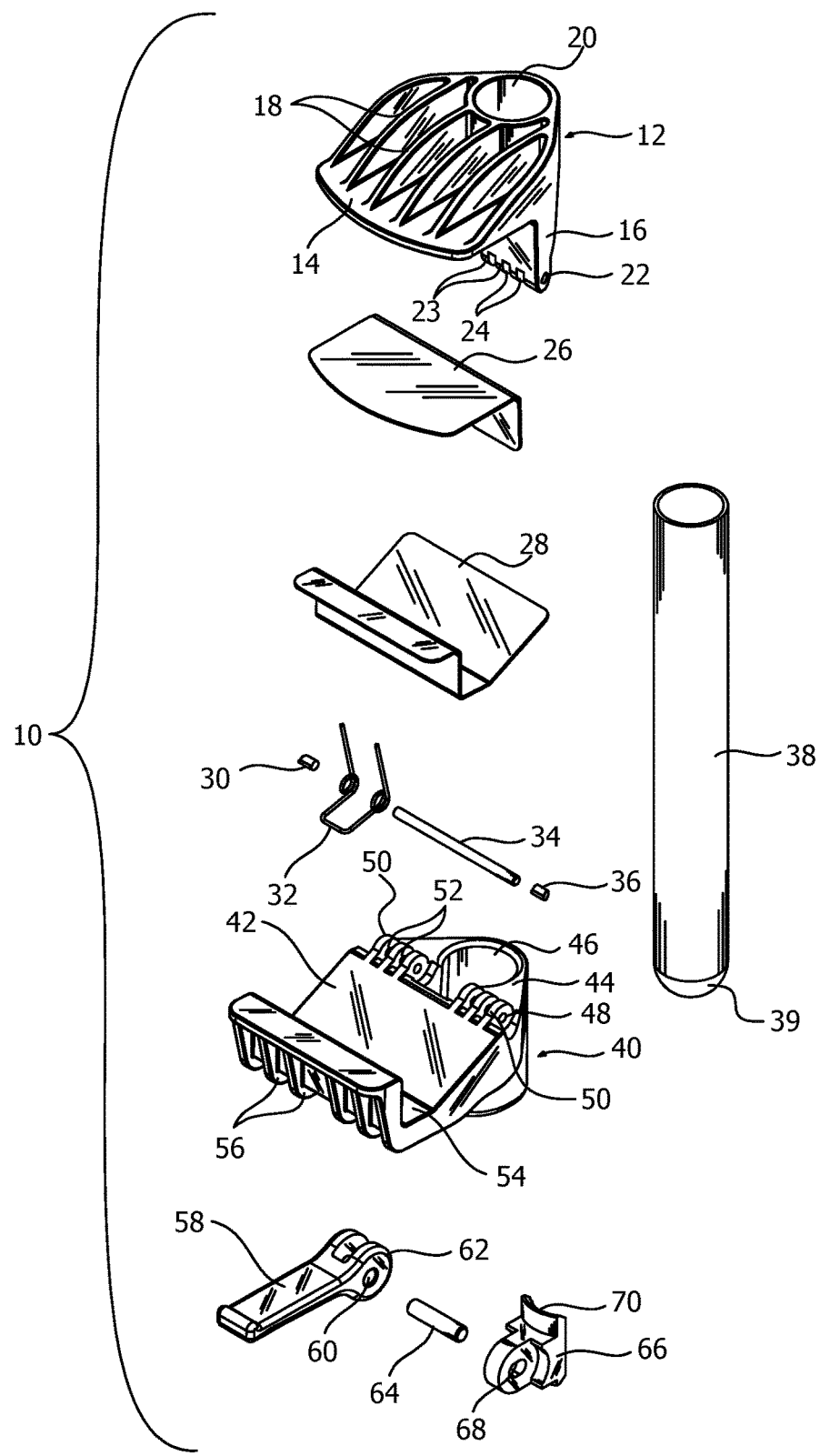
FIG. 6 is an exploded perspective view of the clamp assembly of FIG. 1.

An illustrative embodiment of a clamp assembly is seen generally at 10 in FIGS. 1-6. The illustrated clamp assembly 10 is particularly useful for attaching an object to a mounting surface, such as a tabletop mounting surface (e.g., the portion of the tabletop 72 illustrated in FIGS. 10 and 11). With reference initially to FIGS. 1, 3, and 6, it can be seen that the clamp assembly 10 generally comprises an upper clamp member 12, the upper clamp member 12 including a first aperture 20 formed therethrough for receiving a post member 38; and a lower clamp member 40 pivotally coupled to the upper clamp member 12, the lower clamp member 40 including a second aperture 46 formed therethrough for receiving the post member 38. When the post member 38 is disposed through the first aperture 20 of the upper clamp member 12 and the second aperture 46 of the lower clamp member 40 (e.g., as shown in FIGS. 1 and 3), the upper and lower clamp members 12, 40 are maintained in a generally stationary position relative to one another, and in an engaging relationship with the mounting surface or surfaces (e.g., one or more surfaces of a tabletop 72—see FIGS. 10 and 11). As shown in FIGS. 1, 3, 4, 6, and 9-11, the post member 38 may be provided with a hemispherical end cap 39 disposed on the lower end thereof. Advantageously, the end cap 39 protects users from contacting the lower edge of the post member 38, which may be sharp.

Figure 7:
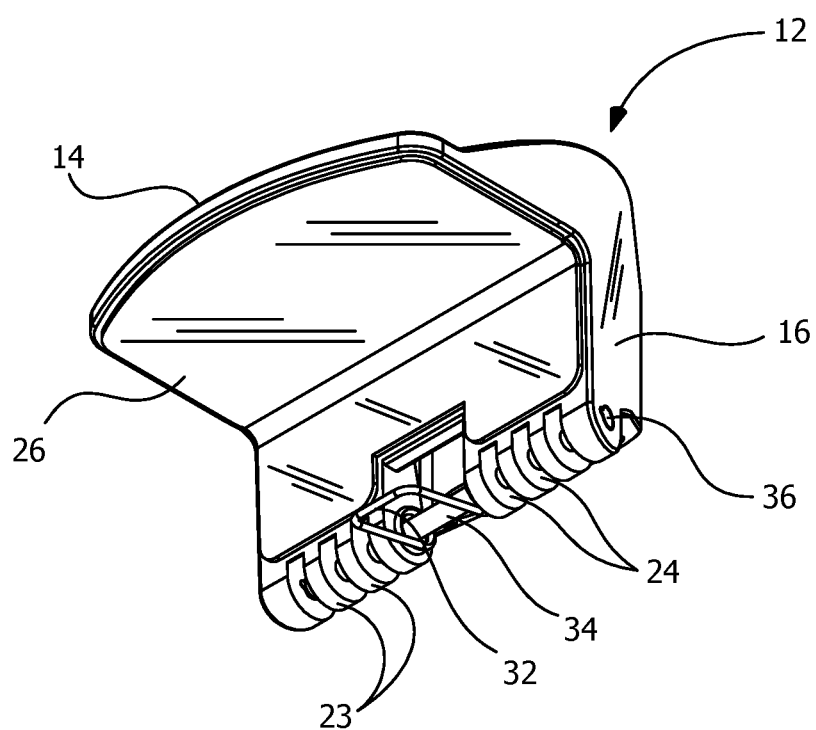
FIG. 7 is a perspective view of an upper clamp member of the clamp assembly of FIG. 1.

Now, referring primarily to FIGS. 1, 6, and 7, the structural features of the illustrative embodiment of the upper clamp member 12 will be explained. As shown in these figures, the upper clamp member 12 generally comprises a cantilevered top portion 14 and a downwardly extending bottom portion 16. The downwardly extending bottom portion 16 of the upper clamp member 12 is attached to, and extends in a downward direction from the cantilevered top portion 14. As best illustrated in FIGS. 1, 3, and 6, the first post aperture 20 is formed through the cantilevered top portion 14 and the downwardly extending bottom portion 16 of the upper clamp member 12. The cantilevered top portion 14 of the upper clamp member 12, which is generally in the form of an outwardly extending shelf, is configured to engage the mounting surface with which the clamp assembly 10 is engaged (e.g., the cantilevered top portion 14 is clamped against the top surface of a tabletop 72 with which the clamp assembly 10 is engaged—see e.g., FIGS. 10 and 11). As shown in FIGS. 1, 2, and 6, in the illustrative embodiment, the cantilevered top portion 14 of the upper clamp member 12 comprises a plurality of ribs 18 (e.g., six (6) ribs 18) for increasing a structural rigidity of the cantilevered top portion 14. Advantageously, the spaced-apart ribs 18 on the top of the cantilevered top portion 14 increase the structural rigidity of the upper clamp member 12, and thus allow less material to be used to form the upper clamp member 12 without compromising the structural integrity thereof. Referring collectively to FIGS. 6 and 7, it can be seen that, in the illustrative embodiment, the underside of the upper clamp member 12 may be provided with an L-shaped upper clamp plate member 26 for further increasing the structural integrity of the upper clamp member 12. When the clamp assembly 10 is engaged with a mounting surface or surfaces (e.g., one or more surfaces of a tabletop 72—see e.g., FIGS. 10 and 11), the L-shaped clamp plate member 26 is disposed against, and contacts the top surface and side surface of the tabletop 72.

Figure 8:
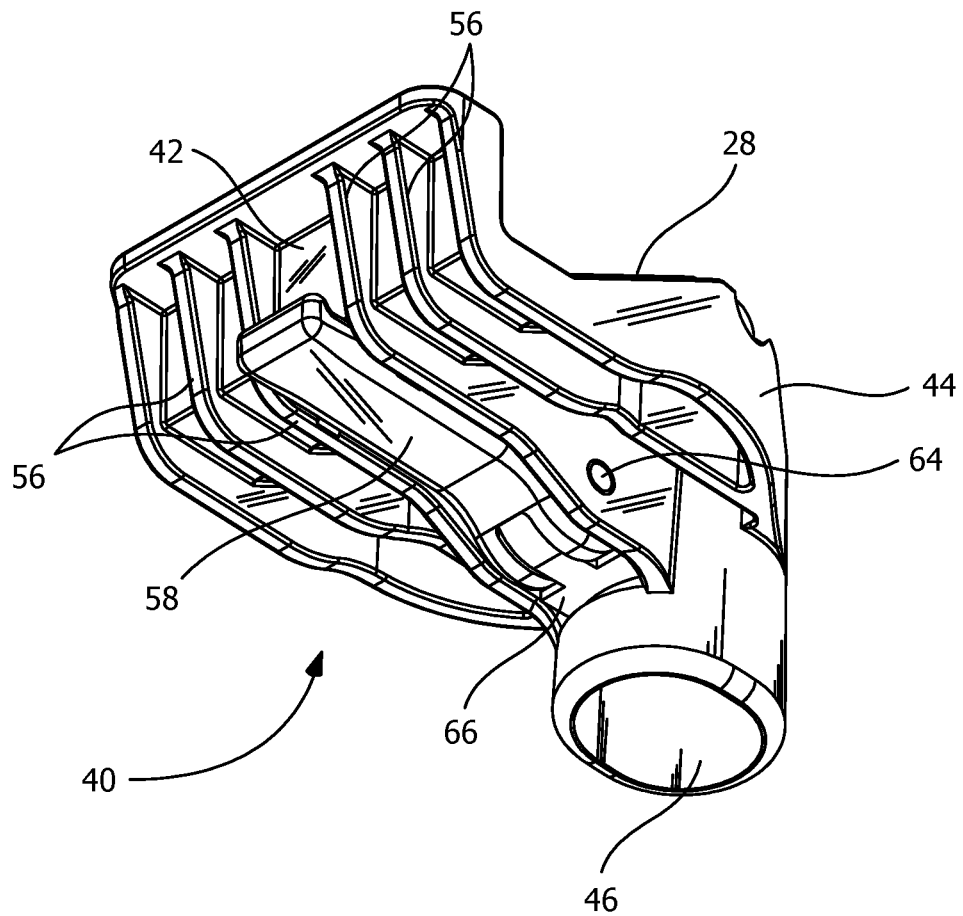
FIG. 8 is a perspective view of a lower clamp member of the clamp assembly of FIG. 1.
Figure 9:
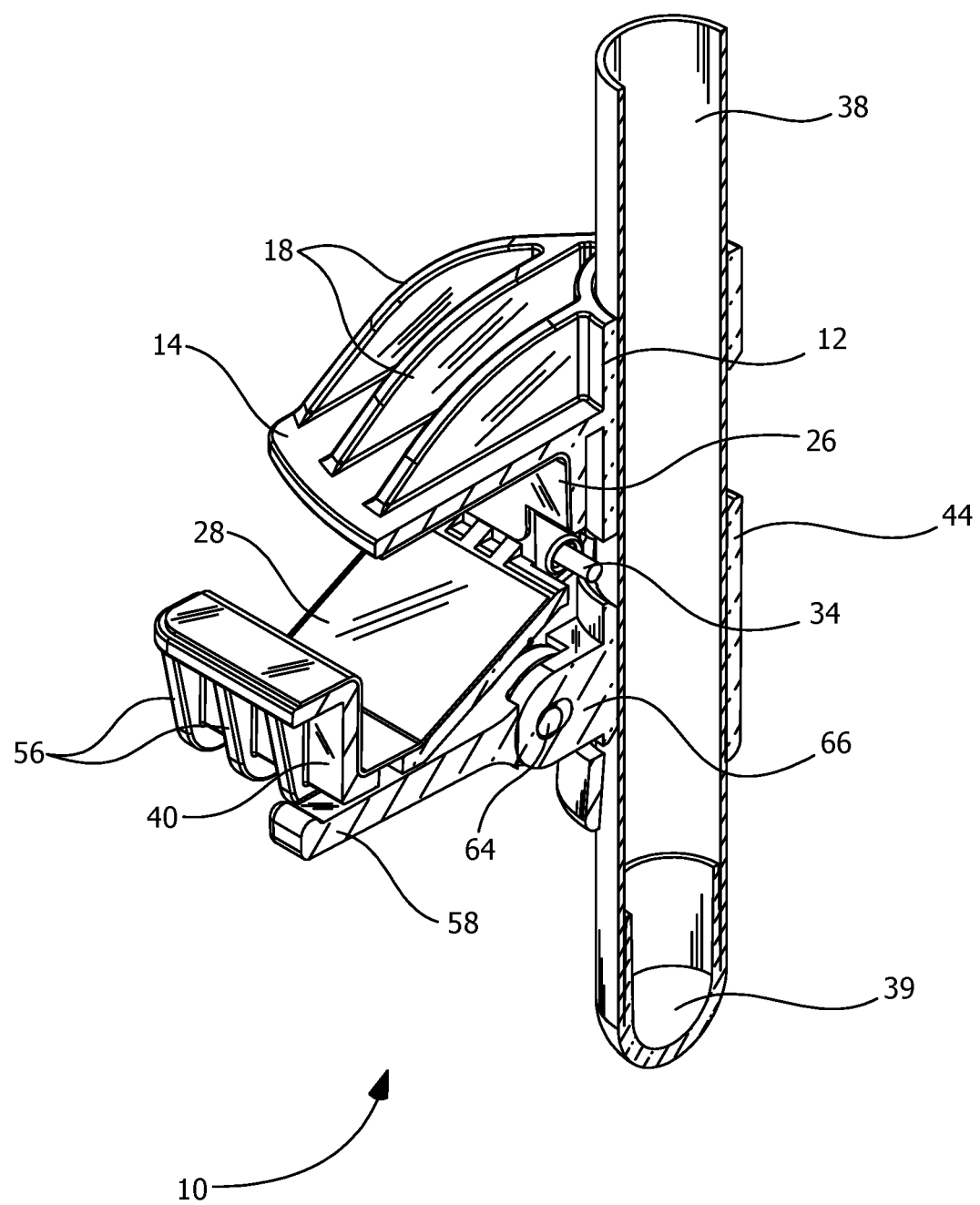
FIG. 9 is a cross-sectional perspective view of the clamp assembly and post member of FIG. 1, wherein the cross-section is longitudinally cut through the clamp assembly and post member.

Next, referring primarily to FIGS. 1, 6, and 8, the structural features of the illustrative embodiment of the lower clamp member 40 will now be described. As shown in these figures, the lower clamp member 40 generally comprises a cantilevered portion 42 and a post receiving portion 44. The post receiving portion 44 of the lower clamp member 40 is attached to, and extends in a generally downward direction from the cantilevered portion 42 (see FIGS. 3 and 8). As best illustrated in FIGS. 1, 3, 6, and 8, the second post aperture 46 is formed through the post receiving portion 44 of the lower clamp member 40. The cantilevered portion 42 of the lower clamp member 40, which is generally in the form of an outwardly extending hook-shaped projection, is configured to engage the mounting surface with which the clamp assembly 10 is engaged (e.g., the hook-shaped cantilevered portion 42 is clamped against the underside or bottom surface(s) of a tabletop 72 with which the clamp assembly 10 is engaged—see e.g., FIGS. 10 and 11). The cantilevered portion 42 of the lower clamp member 40 comprises a notch 54 (e.g., a tabletop receiving notch 54) formed therein for receiving a cross-sectional portion of the mounting object with which the clamp assembly 10 is engaged (e.g., a cross-sectional portion of the downturned edge of the tabletop 72 in FIGS. 10 and 11). As shown in FIGS. 4, 5, and 8, in the illustrative embodiment, the cantilevered portion 42 of the lower clamp member 40 also comprises a plurality of ribs 56 (e.g., six (6) ribs 56) for increasing a structural rigidity of the cantilevered portion 42. Advantageously, the spaced-apart ribs 56 on the bottom of the cantilevered portion 42 increase the structural rigidity of the lower clamp member 40, and thus allow less material to be used to form the lower clamp member 40 without compromising the structural integrity thereof. Referring collectively to FIGS. 3 and 6, it can be seen that, in the illustrative embodiment, the top of the lower clamp member 40 may be provided with a zigzag-shaped or Z-shaped lower clamp plate member 28 for further increasing the structural integrity of the lower clamp member 40. As shown in FIGS. 3 and 6, the lower clamp plate member 28 is received within the notch 54 formed in the cantilevered portion 42. When the clamp assembly 10 is engaged with a mounting surface or surfaces (e.g., one or more surfaces of a tabletop 72—see e.g., FIGS. 10 and 11), the zigzag-shaped or Z-shaped clamp plate member 28 is disposed against, and contacts the bottom surfaces of the tabletop 72.

In an exemplary embodiment, the upper clamp member 12 and the lower clamp member 40 may be formed from a suitable polymeric material or plastic (e.g., the clamp members 12, 40 may be injection-molded using a suitable plastic). Also, in an exemplary embodiment, the L-shaped upper clamp plate member 26 and the Z-shaped lower clamp plate member 28 may be formed from a suitable metallic material or metal (e.g., the clamp plate members 26, 28 may be metal-stamped, etc.).

Turning again to FIGS. 1, 3, 6, and 7, the hinge subassembly, which pivotally couples the lower clamp member 40 to the upper clamp member 12, will now be described. Initially, as shown in FIGS. 6 and 7, the upper clamp member 12 further comprises a first plurality of spaced-apart hinge tabs 23, and the lower clamp member 40 further comprises a second plurality of spaced-apart hinge tabs 50. Each of the first plurality of spaced-apart hinge tabs 23 of the upper clamp member 12 is engaged with first hinge slots 52 disposed adjacent to each of the second plurality of spaced-apart hinge tabs 50 of the lower clamp member 40. Similarly, each of the second plurality of spaced-apart hinge tabs 50 of the lower clamp member 40 is engaged with second hinge slots 24 disposed adjacent to each of the first plurality of spaced-apart hinge tabs 23 of the upper clamp member 12. The interlocking structure of the hinge subassembly of the clamp assembly 10 is formed by the engagement between the first plurality of spaced-apart hinge tabs 23 and respective ones of the first hinge slots 52 and the engagement between the second plurality of spaced-apart hinge tabs 50 and respective ones of the second hinge slots 24. With reference again to the exploded view of FIG. 6, it can be seen that the first plurality of spaced-apart hinge tabs 23 of the upper clamp member 12 further comprise first hinge pin apertures 22 disposed therethrough, while the second plurality of spaced-apart hinge tabs 50 of the lower clamp member 40 further comprise second hinge pin apertures 48 disposed therethrough. The first hinge pin apertures 22 and the second hinge pin apertures 48 together receive a hinge pin member 34 for pivotally coupling the lower clamp member 40 to the upper clamp member 12. As shown in FIG. 6, it can be seen that the hinge subassembly further comprises a torsional spring member 32 that is disposed around the hinge pin member 34. The torsional spring member 32 is configured to bias the upper and lower clamp members 12, 40 in an engaging relationship with the mounting surface or surfaces (e.g., one or more surfaces of the tabletop). In other words, the torsional spring member 32 biases the upper and lower clamp members 12, 40 in a clamped position. In addition, as best illustrated in the exploded view of FIG. 6, the hinge subassembly may additionally include a pair of end cap members 30, 36 that are configured to cover the opposed ends of the hinge pin member 34 when it is inserted through the first and second hinge pin apertures 22, 48. That is, each of the end cap members 30, 36 is configured to snap into a respective aperture 22 in the outermost ones of the hinge tabs 23 of the upper clamp member 12 (see e.g., FIGS. 1, 3, and 7) so as to conceal the exposed ends of the hinge pin member 34 and to keep the hinge pin member 34 in place within the apertures 22, 48. Certain features of the hinge subassembly are also illustrated in the longitudinal cross-sectional view of FIG. 9.

As shown in FIGS. 1, 3-6, and 8, the clamp assembly 10 further comprises a clamp securement subassembly 58, 64, 66 for further securing the upper and lower clamp members 12, 40 in place relative to one another by frictionally engaging an outer surface of the post member 38. While the clamp securement subassembly comprises a cam lock mechanism in the illustrative embodiment, it is to be understood that clamp securement subassembly may be embodied in other forms in other embodiments of the invention, such as being in the form of a tensioning-style knob, as will be described hereinafter with reference to FIG. 12. In the illustrative embodiment (see FIGS. 6 and 9), the cam lock-type clamp securement mechanism generally includes a handle portion 58 with an eccentrically-shaped end portion 62 and a pole or post securement member 66 with an engagement surface 70 for frictionally engaging the outer surface of the post member 38. In the illustrative embodiment, the engagement surface 70 of the post securement member 66 is in the form of a concave surface in order to receive the convex outer surface of the post member 38 (refer to FIGS. 5 and 6). The handle portion 58 of the cam lock-type clamp securement mechanism of the illustrative embodiment is pivotally coupled to the post securement member 66 by means of a pin member 64 (see FIGS. 6 and 9). The pin member 64 is received through a pin aperture 60 in the handle portion 58 and an elongate pin aperture 68 (i.e., an oval-shaped pin aperture 68) in the post securement member 66 so as pivotally connect the components 58, 66 to one another. The oval-shaped pin aperture 68 provides the clearance that is necessary for the slight lateral displacement of the post securement member 66 towards the post member 38. When the handle portion 58 of the cam lock mechanism is rotated into an engagement position (e.g., by a user rotating the handle portion 58 in a clockwise direction), the eccentrically-shaped end portion 62 of the handle portion 58 applies a force against the post securement member 66 such that it is laterally displaced and the concave engagement surface 70 of the post securement member 66 is pushed into frictional engagement with the convex outer surface of the post member 38. In the engaged position, the handle portion 58 of the cam lock mechanism is disposed in a generally horizontal position (i.e., in the position illustrated in FIGS. 1 and 3-5). Conversely, when the handle portion 58 of the cam lock mechanism is rotated into a disengaged position (e.g., by a user rotating the handle portion 58 in a counter-clockwise direction), the force applied by the eccentrically-shaped end portion 62 of the handle portion 58 against the post securement member 66 is released such that the concave engagement surface 70 of the post securement member 66 is disengaged from the convex outer surface of the post member 38. In the disengaged position, the handle portion 58 of the cam lock mechanism is disposed in a generally downward position (i.e., approximately 90 degrees counter-clockwise from its engaged position of FIGS. 1 and 3-5). As such, in the illustrative embodiment, the handle portion 58 is rotated approximately 90 degrees between its engaged and disengaged positions. In its engaged position, when the concave engagement surface 70 of the post securement member 66 frictionally engages the convex outer surface of the post member 38, the clamp securement subassembly 58, 64, 66 of the clamp assembly 10 is additionally configured to maintain the post member 38 in a generally stationary position relative to the clamp assembly 10 (i.e., the clamp securement subassembly 58, 64, 66 restrains the movement of the post member 38 in an axial direction so the post member 38 is not able to slide up and down relative to the clamp assembly 10). As such, the post member 38 is locked into position by the clamp securement subassembly 58, 64, 66. The clamp securement subassembly 58, 64, 66 uses the vertically-oriented post member 38 to further secure the clamp assembly 10 (i.e., to force the clamp assembly 10 tight).

Figure 11:
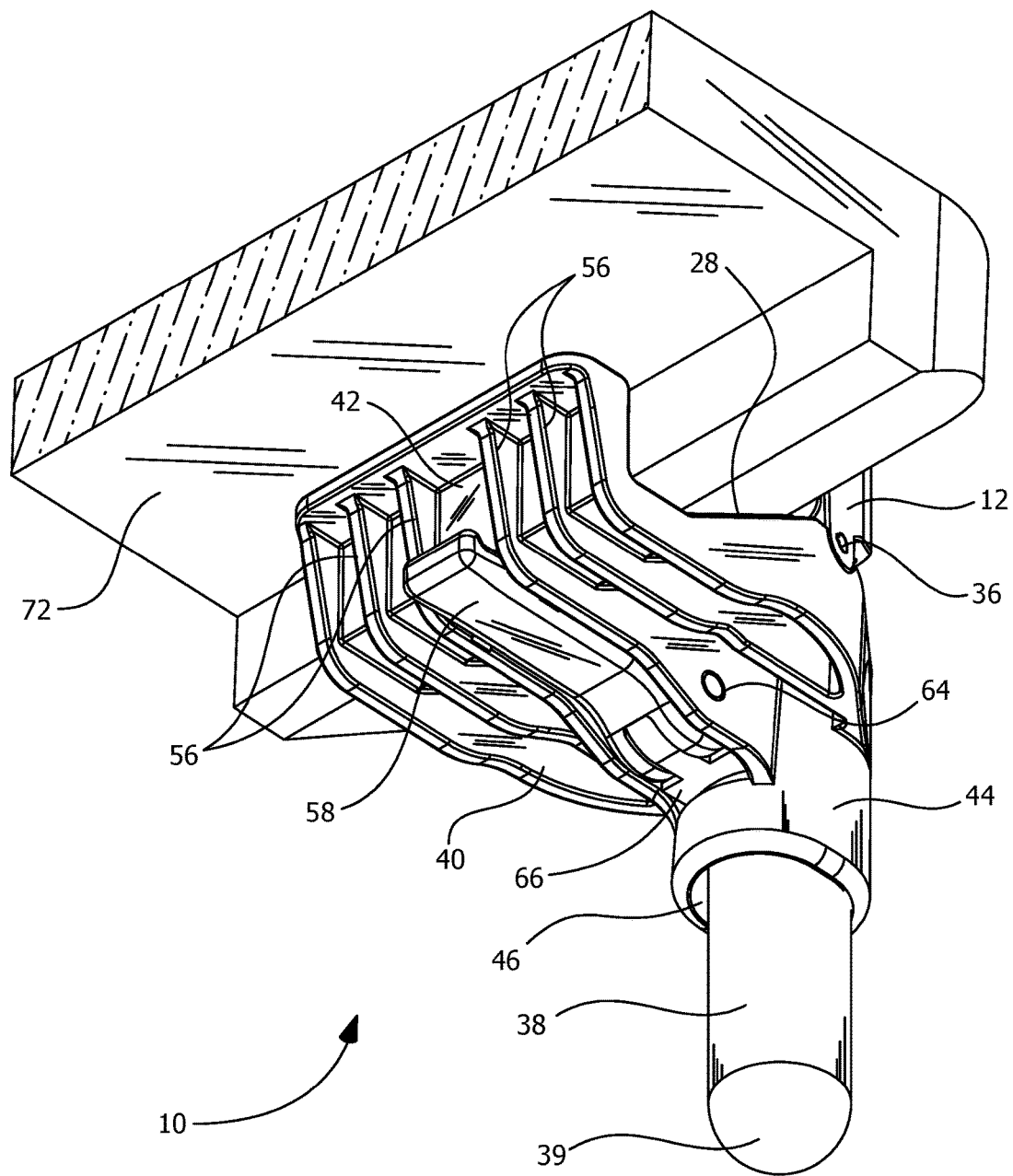
FIG. 11 is a bottom perspective view illustrating the clamp assembly of FIG. 1 engaged with the portion of the tabletop.
Figure 12:
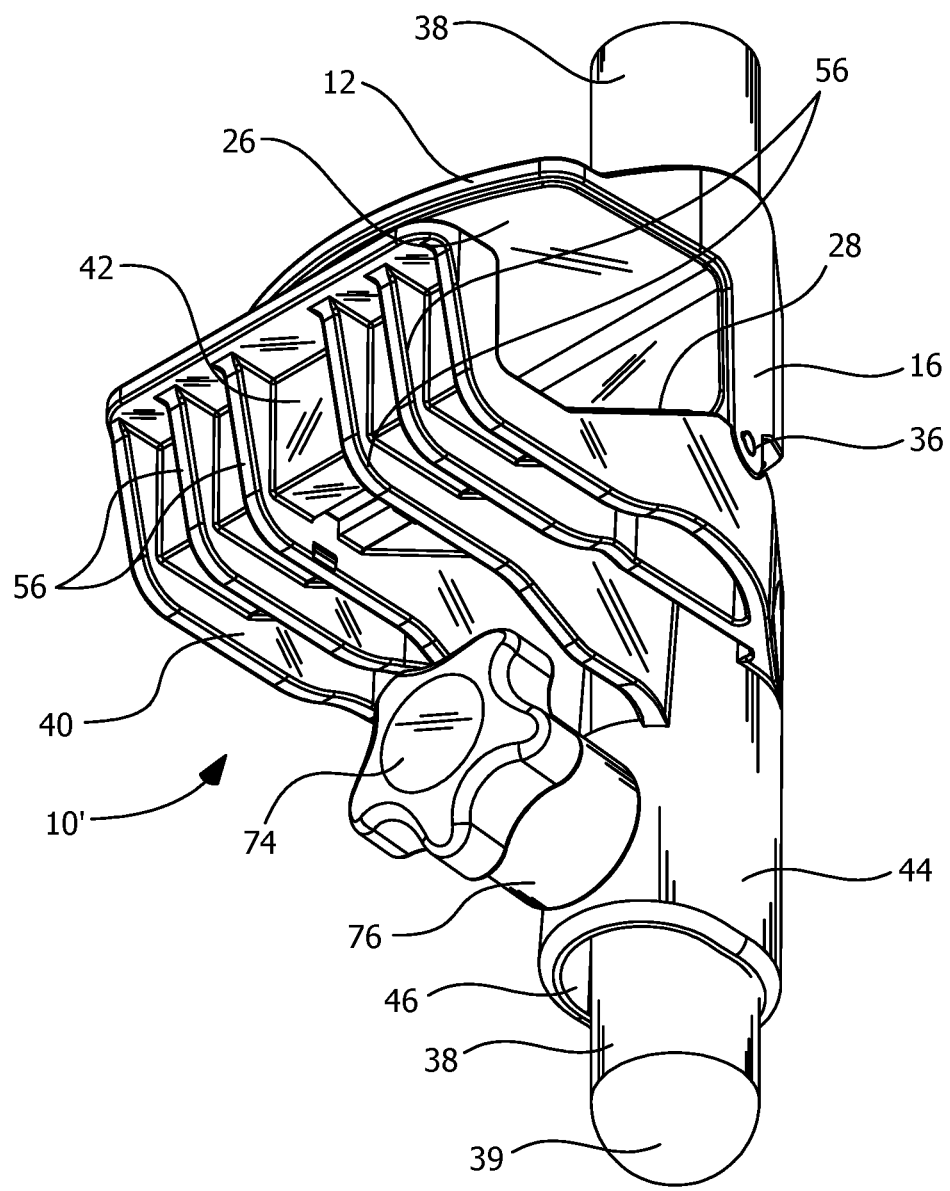
FIG. 12 is a bottom perspective view of another clamp assembly with a post member supported therein, according to an alternative embodiment of the invention, wherein the clamp securement subassembly is in the form of a tensioning-style knob, rather than the cam lock mechanism illustrated in the embodiment of FIGS. 1-11.

Referring to FIG. 12, an alternative embodiment of a clamp assembly 10' is illustrated therein. The clamp assembly 10' of FIG. 12 is similar in most respects to the clamp assembly 10 of FIGS. 1-11 described above, except that the clamp assembly 10' is provided with a clamp securement subassembly in the form of a tensioning-style knob, rather than a cam lock mechanism. As shown in the bottom perspective view of FIG. 12, the knob-type securement subassembly comprises a knob member 74 and a tubular housing member 76 for enclosing the shaft of the knob member 74. In one or more embodiments, the knob member 74 may be attached to a threaded shaft that threadingly engages a post securement member. When the knob member 74 of the securement subassembly in FIG. 12 is rotated in a first rotational direction (e.g., a clockwise direction), the threaded shaft of the knob 74 rotates within a threaded aperture in the securement member in such a manner that the post securement member is laterally displaced towards the post member 38, and the post securement member is pushed into frictional engagement with the outer side surface of the post member 38. Conversely, when the knob member 74 of the securement subassembly in FIG. 12 is rotated in a second rotational direction that is opposite to the first direction (e.g., a counter-clockwise direction), the threaded shaft of the knob 74 rotates within the threaded aperture in the securement member in such a manner that the post securement member is laterally displaced away from the post member 38, and the post securement member is removed from frictional engagement with the outer side surface of the post member 38.

It is readily apparent that the aforedescribed clamp assembly 10 offers numerous advantages. First, the clamp assembly 10 is readily versatile, and is capable of being used for many different applications (i.e., for supporting a wide variety of post-mounted items, such as those described below). Secondly, the clamp assembly 10 has a substantial load carrying capacity (e.g., five pounds or more), and thus is capable of supporting relatively heavy objects from a support surface (i.e., a tabletop surface). Finally, the clamp assembly 10 is not susceptible to inadvertent disengagement even if it is significantly loaded with relatively heavy objects (i.e., even if the clamp assembly 10 is loaded over its typically capacity, its clamp securement subassembly 58, 64, 66 will prevent it from becoming inadvertently disengaged from the support surface).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention. For example, while the hinge subassembly is generally disposed at the bottom of the upper clamp member 12 and at the top of the lower clamp member 40 in the illustrated embodiment, it is to be understood that the hinge subassembly may be moved to other suitable locations on the clamp assembly 10 in order to accommodate the specific mounting surface with which the clamp assembly 10 is engaged. Moreover, as another example, while the post member 38 has a generally circular cross-section in the illustrated embodiment, it is to be understood that the clamp assembly 10 may be readily configured to accommodate post members having other cross-sectional geometries as well (e.g., square cross-sections, elliptical or oval cross-sections, etc.) by modifying the cross-sectional shapes of the first and second apertures 20, 46 to correspond to the desired post shape. Also, the clamp assembly 10 is capable of being readily modified to accommodate post members 38 of virtually any size. Furthermore, as another example, the shapes and sizes of the upper and lower jaw-like clamp members 12, 40 may be modified to accommodate virtually any mounting surface (e.g., to wrap around different tabletop geometries). In addition, as yet another example, while the clamp securement subassembly (i.e., the cam lock mechanism) is generally located at the bottom of the clamp assembly 10 in the illustrated embodiment, it is to be understood that the clamp securement subassembly may be moved to other locations on the clamp assembly 10 to accommodate a wide variety of different mounting arrangements (e.g., the clamp securement subassembly may be alternatively located on the top, front, or back of the clamp assembly 10).

Figure 10:
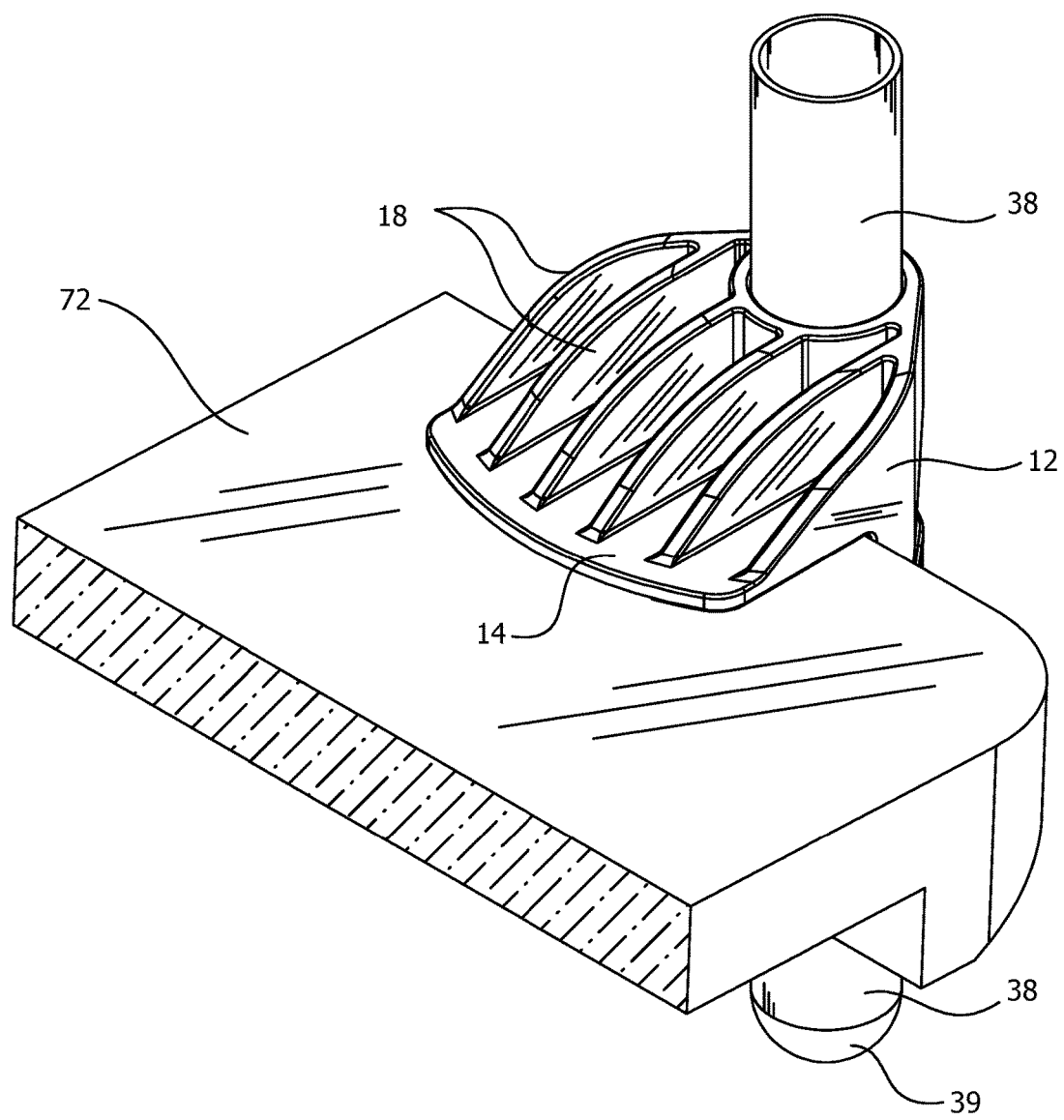
FIG. 10 is a top perspective view illustrating the clamp assembly of FIG. 1 engaged with a portion of a tabletop.

It is to be understood the vertical post member 38 of the illustrated embodiment may be used for mounting virtually any object or device to the mounting surface or surfaces (e.g., to the surfaces of a tabletop 72—see e.g., FIGS. 10 and 11). For example, when the clamp assembly 10 is secured to a keyboardist or disc jockey table (e.g., such as that described in commonly-owned U.S. patent application Ser. No. 14/361,648), the vertical post member 38 may be used for mounting any one or all of the following devices: (i) a laptop computer support stand, (ii) a tablet computing device support stand, (iii) a boom microphone attachment, and (iv) a second tier keyboard attachment. Advantageously, the clamp assembly 10 with the support post 38 allows devices to mounted above the top surface of the tabletop, thereby freeing virtually the entire top surface of the tabletop for other uses. As such, when the clamp assembly 10 is utilized in conjunction with the tabletop, the overall functionality of the table is greatly enhanced.

While exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A clamp assembly for attaching an object to a mounting surface, said clamp assembly comprising:
    an upper clamp member, said upper clamp member including a first aperture formed therethrough for receiving a post member, said upper clamp member further including an upper clamping jaw portion configured to engage said mounting surface;
    a lower clamp member pivotally coupled to said upper clamp member, said lower clamp member including a second aperture formed therethrough for receiving said post member, said lower clamp member further including a lower clamping jaw portion configured to engage an underside of said mounting surface; and
    a hinge subassembly pivotally coupling said lower clamp member to said upper clamp member, said hinge subassembly being disposed between said upper clamping jaw portion and said first aperture of said upper clamp member, and said hinge subassembly being disposed between said lower clamping jaw portion and said second aperture of said lower clamp member;
    wherein, when said post member is disposed through said first aperture of said upper clamp member and said second aperture of said lower clamp member, said upper and lower clamp members are maintained in a generally stationary position relative to one another, and in an engaging relationship with said mounting surface.

2. The clamp assembly according to claim 1, wherein said upper clamp member further comprises a cantilevered top portion forming said upper clamping jaw portion and a downwardly extending bottom portion.

3. The clamp assembly according to claim 2, wherein said cantilevered top portion of said upper clamp member comprises a plurality of ribs for increasing a structural rigidity of said cantilevered top portion.

4. The clamp assembly according to claim 1, wherein said lower clamp member further comprises a cantilevered portion forming said lower clamping jaw portion and a post receiving portion, said post receiving portion including said second aperture formed therein.

5. The clamp assembly according to claim 4, wherein said cantilevered portion of said lower clamp member comprises a plurality of ribs for increasing a structural rigidity of said cantilevered portion.

6. The clamp assembly according to claim 1, wherein said upper clamp member further comprises a first plurality of spaced-apart tabs, and said lower clamp member further comprises a second plurality of spaced-apart tabs, each of said first plurality of spaced-apart tabs of said upper clamp member being engaged with first slots disposed adjacent to each of said second plurality of spaced-apart tabs of said lower clamp member, and each of said second plurality of spaced-apart tabs of said lower clamp member being engaged with second slots disposed adjacent to each of said first plurality of spaced-apart tabs of said upper clamp member, wherein the engagement between said first plurality of spaced-apart tabs and respective said first slots and the engagement between said second plurality of spaced-apart tabs and respective said second slots forms a portion of said hinge subassembly.

7. The clamp assembly according to claim 6, wherein said first plurality of spaced-apart tabs of said upper clamp member further comprise first hinge pin apertures disposed therethrough, and said second plurality of spaced-apart tabs of said lower clamp member further comprise second hinge pin apertures disposed therethrough, said first hinge pin apertures and said second hinge pin apertures together receiving a hinge pin for pivotally coupling said lower clamp member to said upper clamp member.

8. The clamp assembly according to claim 1, wherein said hinge subassembly further comprises a torsional spring member, said torsional spring member configured to bias said upper and lower clamp members in said engaging relationship with said mounting surface.

9. The clamp assembly according to claim 1, further comprising a clamp securement subassembly for further securing said upper and lower clamp members in place relative to one another by frictionally engaging an outer surface of said post member.

10. The clamp assembly according to claim 9, wherein said clamp securement subassembly is additionally configured to maintain said post member in a generally stationary position relative to said clamp assembly.

11. The clamp assembly according to claim 9, wherein said clamp securement subassembly comprises one of: (i) a cam lock mechanism, and (ii) a tensioning-style knob.

12. The clamp assembly according to claim 11, wherein said clamp securement subassembly comprises said cam lock mechanism, said cam lock mechanism including a handle portion with an eccentrically-shaped end portion and a post securement member with an engagement surface for frictionally engaging said outer surface of said post member, said handle portion of said cam lock mechanism being pivotally coupled to said post securement member of said cam lock mechanism.

13. The clamp assembly according to claim 12, wherein said cam lock mechanism further includes a pin member for pivotally coupling said handle portion to said post securement member, said pin member being received through a pin aperture in said handle portion and an elongate pin aperture in said post securement member; and
    wherein, when said handle portion of said cam lock mechanism is rotated into an engagement position, said eccentrically-shaped end portion of said handle portion applies a force against said post securement member such that said engagement surface of said post securement member is pushed into frictional engagement with said outer surface of said post member.

14. A clamp assembly for attaching an object to a mounting surface, said clamp assembly comprising:

an upper clamp member, said upper clamp member including a first aperture formed therethrough for receiving a post member; and a lower clamp member pivotally coupled to said upper clamp member, said lower clamp member including a second aperture formed therethrough for receiving said post member;

wherein, when said post member is disposed through said first aperture of said upper clamp member and said second aperture of said lower clamp member, said upper and lower clamp members are maintained in a generally stationary position relative to one another, and in an engaging relationship with said mounting surface; and wherein said clamp assembly further comprises a clamp securement subassembly for further securing said upper and lower clamp members in place relative to one another by frictionally engaging an outer surface of said post member, said clamp securement subassembly being additionally configured to maintain said post member in a generally stationary position relative to said clamp assembly, said clamp securement subassembly comprising a cam lock mechanism, said cam lock mechanism including a handle portion with an eccentrically-shaped end portion and a post securement member with an engagement surface for frictionally engaging said outer surface of said post member, said handle portion of said cam lock mechanism being pivotally coupled to said post securement member of said cam lock mechanism.

15. The clamp assembly according to claim 14, wherein said upper clamp member further comprises a cantilevered top portion and a downwardly extending bottom portion, said cantilevered top portion of said upper clamp member configured to engage said mounting surface; and wherein said lower clamp member further comprises a cantilevered portion and a post receiving portion, said cantilevered portion of said lower clamp member comprising a notch formed therein for receiving a portion of an underside of said mounting surface, and said post receiving portion including said second aperture formed therein.

16. The clamp assembly according to claim 14, further comprising a hinge subassembly for pivotally coupling said lower clamp member to said upper clamp member, said hinge subassembly including a torsional spring member, said torsional spring member configured to bias said upper and lower clamp members in said engaging relationship with said mounting surface.

17. The clamp assembly according to claim 14, wherein said cam lock mechanism further includes a pin member for pivotally coupling said handle portion to said post securement member, said pin member being received through a pin aperture in said handle portion and an elongate pin aperture in said post securement member; and wherein, when said handle portion of said cam lock mechanism is rotated into an engagement position, said eccentrically-shaped end portion of said handle portion applies a force against said post securement member such that said engagement surface of said post securement member is pushed into frictional engagement with said outer surface of said post member.

18. A clamp assembly for attaching an object to a mounting surface, said clamp assembly comprising:

a first clamp member, said first clamp member including a first aperture formed therethrough for receiving a post member, said first clamp member further including a first clamping jaw portion configured to engage said mounting surface;

a second clamp member pivotally coupled to said first clamp member, said second clamp member including a second aperture formed therethrough for receiving said post member, said second clamp member further including a second clamping jaw portion configured to engage an underside of said mounting surface; and a hinge subassembly pivotally coupling said first clamp member to said second clamp member, said hinge subassembly being disposed between said first clamping jaw portion and said first aperture of said first clamp member, and said hinge subassembly being disposed between said second clamping jaw portion and said second aperture of said second clamp member;

wherein, when said post member is disposed through said first aperture of said first clamp member and said second aperture of said second clamp member, said first and second clamp members are maintained in a generally stationary position relative to one another, and in an engaging relationship with said mounting surface; and wherein said clamp assembly further comprises a clamp securement subassembly for further securing said first and second clamp members in place relative to one another, said clamp securement subassembly including a post securement member configured to frictionally engage an outer surface of said post member so as to utilize said post member to tighten said clamp assembly.

19. The clamp assembly according to claim 18, wherein a cross-sectional portion of said second aperture of said second clamp member has an oval shape.

* * * * *